(12) United States Patent
Kagawa et al.

(10) Patent No.: US 12,475,724 B2
(45) Date of Patent: Nov. 18, 2025

(54) VEHICLE SERVICE PROVIDING SYSTEM

(71) Applicant: SUBARU CORPORATION, Tokyo (JP)

(72) Inventors: Konan Kagawa, Tokyo (JP); Ryota Nakamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 301 days.

(21) Appl. No.: 18/449,034

(22) Filed: Aug. 14, 2023

(65) Prior Publication Data
US 2024/0087340 A1 Mar. 14, 2024

(30) Foreign Application Priority Data
Sep. 11, 2022 (JP) ................................ 2022-144231

(51) Int. Cl.
*G06V 20/59* (2022.01)
*G06V 40/16* (2022.01)
*G06V 40/50* (2022.01)

(52) U.S. Cl.
CPC .......... *G06V 20/597* (2022.01); *G06V 40/169* (2022.01); *G06V 40/53* (2022.01)

(58) Field of Classification Search
CPC ..... G06V 20/597; G06V 40/169; G06V 40/53
See application file for complete search history.

(56) References Cited

U.S. PATENT DOCUMENTS

| | | | |
|---|---|---|---|
| 2017/0116467 A1* | 4/2017 | Li | ......................... G06V 40/171 |
| 2022/0289250 A1 | 9/2022 | Oba | |
| 2023/0328039 A1* | 10/2023 | Wang | ...................... G06F 21/32 |
| | | | 726/26 |

FOREIGN PATENT DOCUMENTS

| | | |
|---|---|---|
| JP | 2014-067131 A | 4/2014 |
| JP | 2020-156033 A | 9/2020 |
| JP | 2021-043571 A | 3/2021 |

* cited by examiner

*Primary Examiner* — Casey L Kretzer
(74) *Attorney, Agent, or Firm* — Rimon P.C.

(57) ABSTRACT

A vehicle service providing system includes a vehicle and a server apparatus. The vehicle includes an in-vehicle camera and one or more vehicle processors. The server apparatus includes an output unit, one or more server memories, and one or more server processors. The one or more vehicle processors transmit, to the server apparatus, point group data and patch data regarding the face of an occupant, together with classification data regarding the occupant or the vehicle with which the occupant is uniquely unidentifiable. The one or more server processors carry out morphing with the use of point group data and patch data regarding a selected one of sample face images, and the point group data and the patch data generated regarding the occupant, to generate a morphed face image, and allow the output unit to output the morphed face image, instead of a face image of the occupant.

5 Claims, 12 Drawing Sheets

VEHICLE SERVICE PROVIDING SYSTEM

CROSS-REFERENCE TO RELATED APPLICATIONS

The present application claims priority from Japanese Patent Application No. 2022-144231 filed on Sep. 11, 2022, the entire contents of which are hereby incorporated by reference.

BACKGROUND

The disclosure relates to a vehicle service providing system.

A vehicle such as an automobile may have a malfunction of the vehicle itself while traveling, or an occupant of the vehicle may feel ill while traveling.

Moreover, sometimes, it is desirable that various content services are available to a vehicle or an occupant while traveling.

These vehicle services may include, for example, an emergency response service, an occupant monitoring service for the emergency response service, and a content providing service. The emergency response service includes dealing with a malfunction of a vehicle or illness of an occupant.

When such a vehicle service providing system provides a vehicle service, basically, a vehicle transmits data to a server apparatus, and the server apparatus provides the service based on the data received.

SUMMARY

An aspect of the disclosure provides a vehicle service providing system including a vehicle and a server apparatus. The vehicle is configured to transmit data to the server apparatus, and the server apparatus is configured to provide a service based on the data received. The vehicle includes an in-vehicle camera and one or more vehicle processors. The in-vehicle camera is configured to capture an image of an occupant of the vehicle. The server apparatus includes an output unit, one or more server memories, and one or more server processors. The output unit is configured to output an image. The one or more vehicle processors are configured to acquire a captured image including a face of the occupant, from the in-vehicle camera. The one or more vehicle processors are configured to segment a captured region of the face of the occupant from the captured image acquired. The one or more vehicle processors are configured to generate point group data regarding the face of the occupant. The point group data indicates an outline of the face of the occupant and positions of facial features of the face of the occupant, in the segmented captured region of the face of the occupant. The one or more vehicle processors are configured to generate patch data with the use of the generated point group data as a reference of image separation. The patch data separates the segmented captured region of the face of the occupant. The one or more vehicle processors are configured to transmit, to the server apparatus, the generated point group data and the generated patch data instead of the captured image including the face of the occupant, together with classification data regarding the occupant or the vehicle with which the occupant is uniquely unidentifiable. The one or more server memories are configured to hold data regarding sample face images, as data regarding face images of random persons different from the occupant to be segmented from the captured image. The data regarding the sample face images includes point group data and patch data regarding the sample face images, and is associated with classification data regarding the sample face images. The one or more server processors are configured to select, with the use of the classification data regarding the occupant or the vehicle received from the one or more vehicle processors, one of the sample face images associated with data corresponding to the classification data regarding the occupant or the vehicle, from the sample face images held in the one or more server memories. The one or more server processors are configured to carry out morphing with the use of the point group data and the patch data regarding the selected one of the sample face images, and the point group data and the patch data generated regarding the occupant, to generate a morphed face image. The one or more server processors are configured to allow the output unit to output the morphed face image generated by the morphing, instead of a face image of the occupant of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
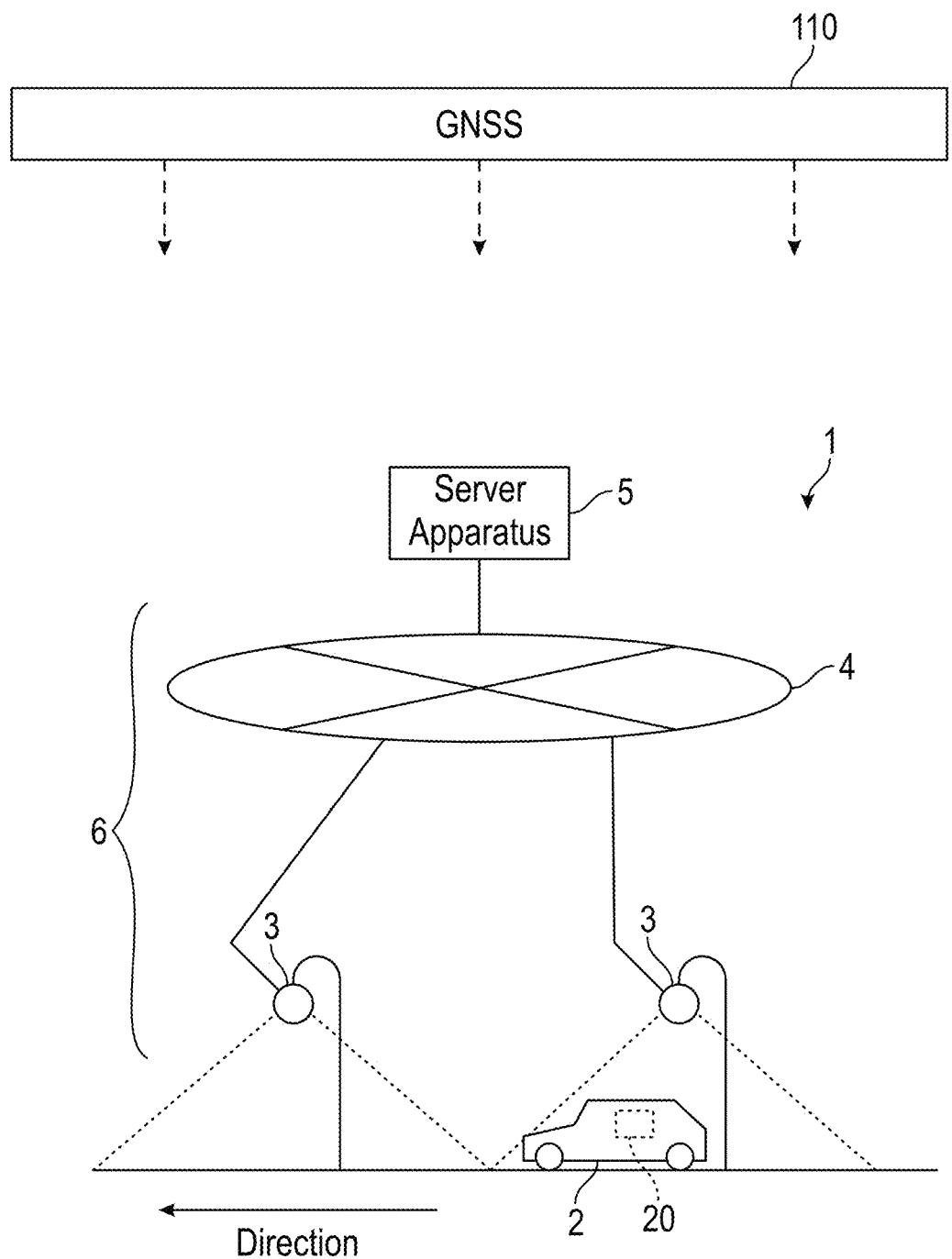
FIG. 1 is a system configuration diagram of a vehicle service providing system according to an embodiment of the disclosure.

When a vehicle service providing system provides a vehicle service, e.g., in particular, an emergency response service and an occupant monitoring service, the vehicle service providing system is expected to transmit, for example, a captured image by an in-vehicle camera from a vehicle to a server apparatus. The captured image indicates a state of an occupant. The captured image by the in-vehicle camera is outputted to and displayed on the server apparatus, making it possible for an operator to accurately grasp, for example, a current state and expression of the occupant, based on the captured image of the occupant. This results in an optimal service for the current state of the occupant, etc.

On the other hand, depending on the kind of data, data transmission from the vehicle to the server apparatus as described above may be restricted based on, for example, laws and regulations. For example, in Europe, independent strict restrictions have been imposed on transmission and reception of personally identifiable information.

Moreover, a company that intends to deal with protection of such personal information would like to voluntarily put optimal limitations on the data to be transmitted from a vehicle to a server apparatus.

The captured image of the occupant of the vehicle as mentioned above includes an image component of the face of the occupant. The face of the occupant is personal information and deserves appropriate protection.

Japanese Unexamined Patent Application Publication (JP-A) Nos. 2021-043571, 2014-067131, and 2020-156033 disclose abstraction, substitution, or masking of an image of the face of an occupant included in a captured image.

However, when the abstracted, substituted, or masked image of the face of the occupant as in JP-A Nos. 2021-043571, 2014-067131, and 2020-156033 is outputted to a server apparatus, an operator may have difficulty in accurately grasping, for example, the current state or the expression of the occupant.

As described, what is desired for a vehicle service providing system is to protect personal information without impairing convenience of the vehicle service providing system.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 is a configuration diagram of a vehicle service providing system 1 according to an embodiment of the disclosure.

The vehicle service providing system 1 in FIG. 1 may include, for example, an automobile 2, and a server apparatus 5. The server apparatus 5 is configured to provide the automobile 2 with a vehicle service. The automobile 2 and the server apparatus 5 may transmit and receive data to and from each other through a communication network system 6.

In one embodiment of the disclosure, the automobile 2 may serve as a "vehicle". Basically, the automobile 2 is configured to accommodate multiple occupants. In the automobile 2 configured to accommodate multiple occupants, a driver and an assistant may be seated side by side in a vehicle widthwise direction. However, the "vehicle" to which the disclosure is applicable is not limited to the automobile 2 having such features.

The communication network system 6 in FIG. 1 may include base stations 3 and a communication network 4. The base stations 3 may be arranged along a travel route of the automobile 2. To the communication network 4, the base stations 3 and the server apparatus 5 may be coupled. The base stations 3 may include, for example, base stations of a carrier communication network for mobile terminals, etc. Alternatively, the base stations 3 may include base stations for an intelligent transportation systems (ITS) service or an advanced driving assistant system (ADAS) service for the automobile 2. Some fifth-generation base stations of carrier communication networks have a high-performance data processing function. In this case, the server apparatus 5 may be distributively provided in the base stations 3.

The automobile 2 may sometimes have a malfunction of the automobile 2 itself while traveling, or an occupant of the automobile 2 may feel ill while traveling.

Moreover, an occupant may sometimes use various kinds of content services while traveling in the automobile 2. Non-limiting examples of the content services may include a music distribution service and a video distribution service.

The vehicle service providing system 1 is configured to provide the automobile 2 with these vehicle services, by using the server apparatus 5 configured to transmit and receive data to and from the automobile 2. The vehicle service providing system 1 may provide, for example, an emergency response service and a monitoring service for the emergency response service. The emergency response service includes, for example, dealing with a malfunction of the automobile 2 or the illness of the occupant of the automobile 2. Moreover, the vehicle service providing system 1 may allow the server apparatus 5 to provide content information.

Figure 2:
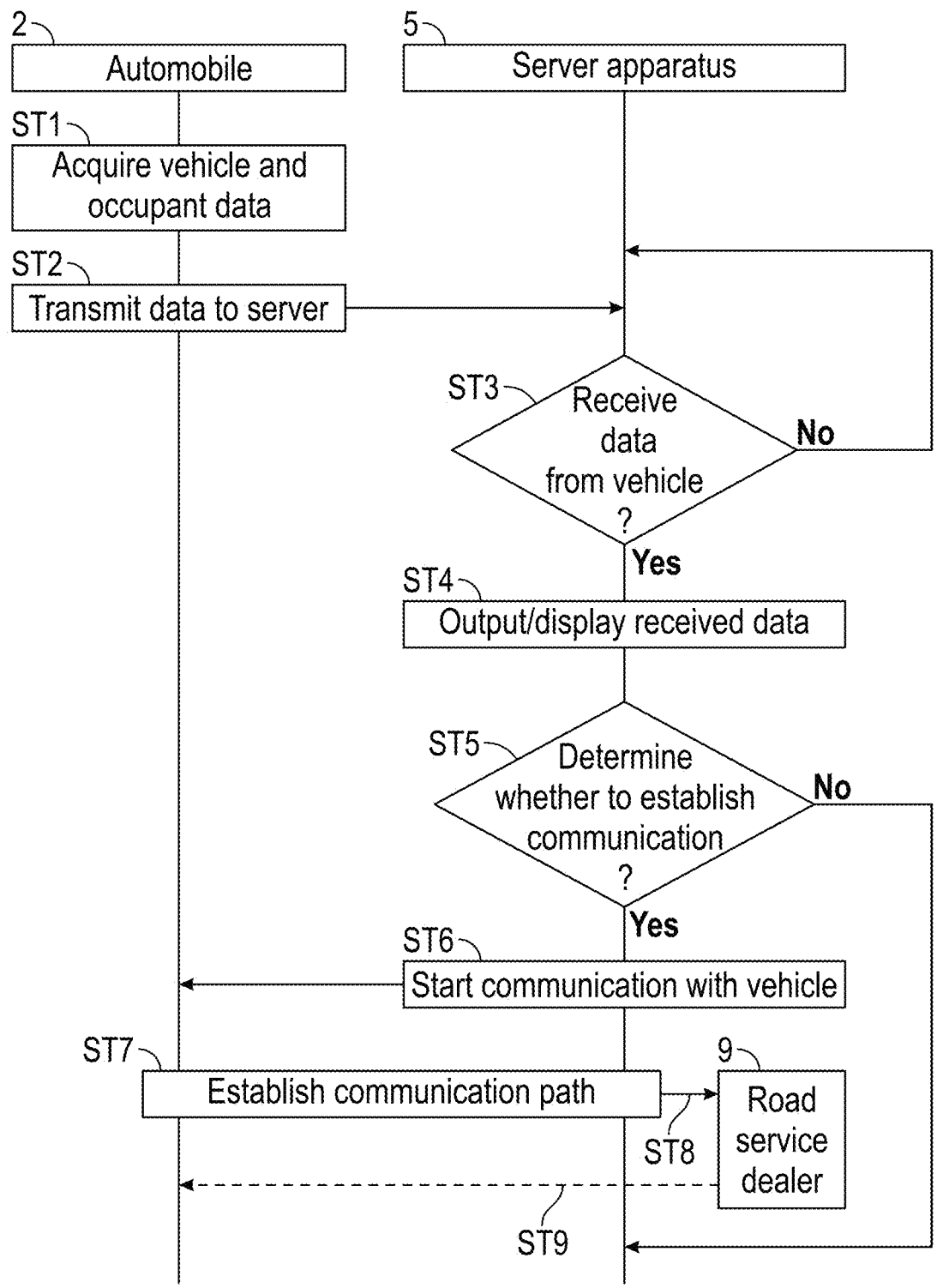
FIG. 2 illustrates a basic communication procedure between an automobile and a server apparatus in FIG. 1, in an example where the vehicle service providing system in FIG. 1 provides an emergency response service.

FIG. 2 illustrates a basic communication procedure between the automobile 2 and the server apparatus 5 in FIG. 1, in an example where the vehicle service providing system 1 in FIG. 1 provides the emergency response service.

FIG. 2 illustrates the automobile 2 and the server apparatus 5. Time flows from top to bottom.

In FIG. 2, in step ST1, the automobile 2 may acquire data regarding the automobile 2 and the occupant. In step ST2, the automobile 2 may transmit the acquired data to the server apparatus 5. The data to be transmitted from the automobile 2 to the server apparatus 5 may basically include data indicating, for example, a state of the automobile 2, and data indicating, for example, a state of the occupant.

In step ST3, the server apparatus 5 may wait for data reception from the automobile 2. Upon receiving the data from the automobile 2, in step ST4, the server apparatus 5 may output the received data by displaying the data. This makes it possible for an operator to check the data regarding the automobile 2 and the occupant. When the operator determines that it is necessary to confirm the data with the occupant, the operator may make an operation on the server apparatus 5. After outputting the received data, in step ST5, the server apparatus 5 may determine whether or not to establish communication. When the server apparatus 5 accepts the operation by the operator, the server apparatus 5 may determine that it is necessary to establish communication. In step ST6, the server apparatus 5 may start communication with the automobile 2. Thus, in step ST7, a communication path is established between the automobile 2 and the server apparatus 5. The communication path allows the operator and the occupant to communicate with each other by speech or moving image.

When the operator determines that an emergency response is necessary, based on a call between the operator and the occupant, the operator may make an operation on the server apparatus 5. In step ST8, the server apparatus 5 may give an urgent notification to a road service dealer 9. Based on the notification, in step ST9, the road service dealer 9 may go into action for the automobile 2. The road service dealer 9 may provide a vehicle service for the emergency response.

Thus, it is possible for the automobile 2 or the occupant to have the emergency response service provided by the vehicle service providing system 1.

As described, in the vehicle service providing system 1, to provide the vehicle service, basically, the automobile 2 is configured to transmit the data to the server apparatus 5, and the server apparatus 5 is configured to provide the service based on the received data.

When such a vehicle service providing system 1 provides, in particular, the emergency response service and the occupant monitoring service described above, it is desired to transmit, for example, a captured image by an in-vehicle camera 55 indicating the state of the occupant from the automobile 2 to the server apparatus 5. The captured image by the in-vehicle camera 55 is outputted to and displayed on the server apparatus 5, making it possible for the operator to accurately grasp, for example, the current state and expression of the occupant based on the captured image of the occupant. As a result, it is possible for the operator to provide, for example, an optimum service in accordance with, for example, the current state of the occupant.

On the other hand, depending on the kind of data, data transmission from the automobile 2 to the server apparatus 5 as described above is sometimes restricted based on, for example, laws and regulations. For example, in Europe, independent strict restrictions have been imposed on transmission and reception of personally identifiable information.

Moreover, a company that intends to deal with protection of such personal information would like to voluntarily put limitations on the data to be transmitted from the automobile 2 to the server apparatus 5.

The captured image of the occupant of the automobile 2 as mentioned above includes an image component of the face of the occupant. A photograph of the face of the occupant as well as the name of the occupant is personal information and deserves appropriate protection as necessary in accordance with requirement by laws and regulations.

As described, what is desired for the vehicle service providing system 1 is to protect personal information without impairing convenience of the vehicle service providing system 1.

Figure 3:
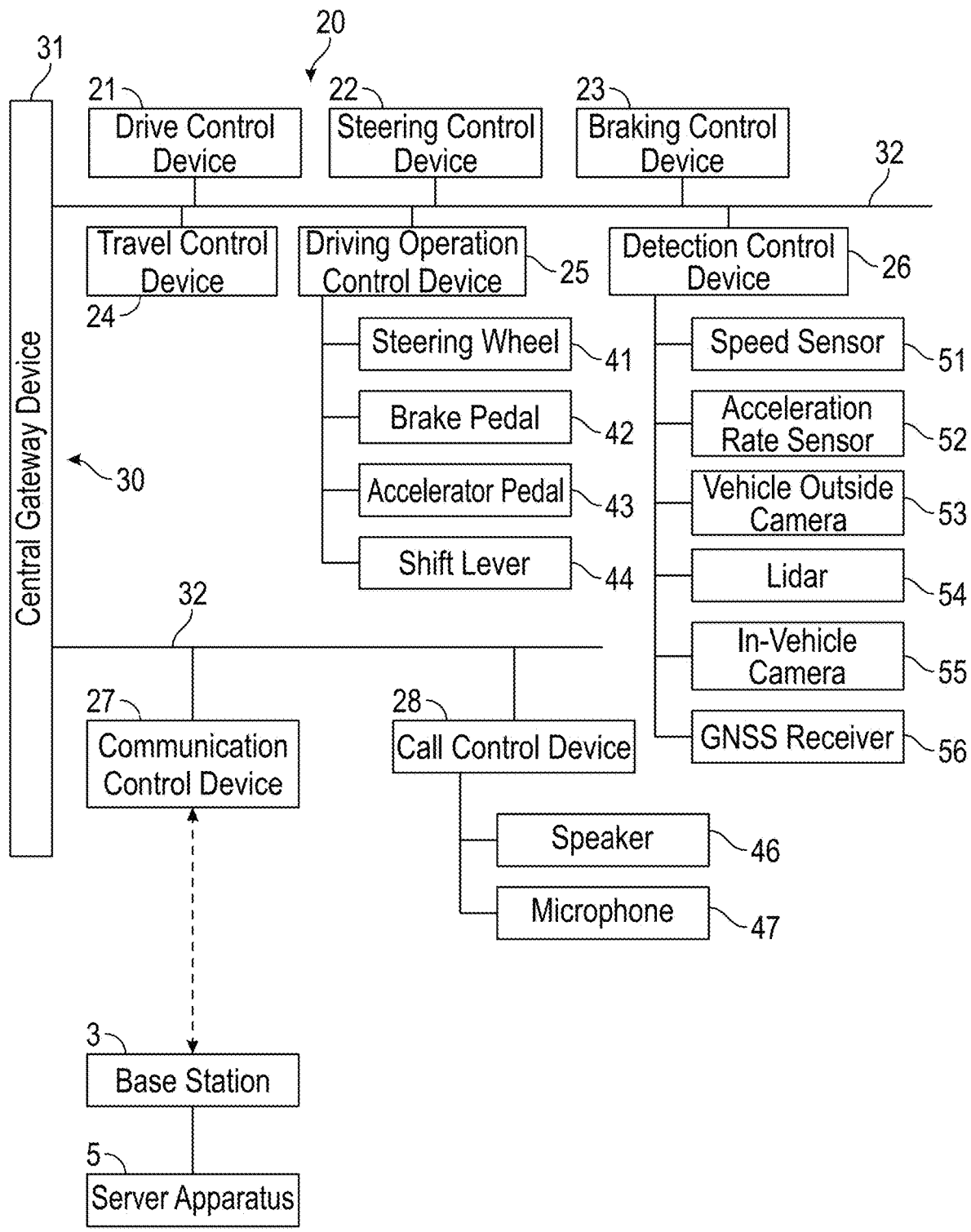
FIG. 3 is a configuration diagram of a control system of the automobile in FIG. 1.

FIG. 3 illustrates a configuration of a control system 20 of the automobile 2 in FIG. 1.

The control system 20 of the automobile 2 in FIG. 3 may include, for example, a vehicle network 30 and control devices coupled to the vehicle network 30. FIG. 3 illustrates, as examples of the control devices, a drive control device 21, a steering control device 22, a braking control device 23, a travel control device 24, a driving operation control device 25, a detection control device 26, a communication control device 27, and a call control device 28. Other examples of the control devices of the automobile 2 may include, for example, an air-conditioning control device, an occupant monitoring control device, and a driving position control device.

The vehicle network 30 may comply with, for example, standards such as the controller area network (CAN) and the local interconnect network (LIN) employed in the automobile 2. Such a vehicle network 30 may include, for example, bus cables 32 and a central gateway device 31. To the bus cables 32, the control devices may be coupled. The central gateway device 31 may serve as a relay device to which the bus cables 32 are coupled. The central gateway device 31 may control routing between the control devices through the bus cables 32. This makes it possible for each of the control devices coupled to one of the bus cables 32 to transmit and receive data to and from another of the control devices coupled to a different one of the bus cables 32.

To the driving operation control device 25, operation members such as a steering wheel 41, a brake pedal 42, an accelerator pedal 43, and a shift lever 44 may be coupled. The operation members may be operated by a driver to allow the automobile 2 to travel. The driving operation control device 25 may detect an operation by the driver on the operation members, generate operation data corresponding to the operation, and output the operation data to the other control devices through the vehicle network 30.

The travel control device 24 may control travel of the automobile 2. For example, the travel control device 24 may acquire the operation data from the driving operation control device 25 through the vehicle network 30. The travel control device 24 may generate drive data, steering data, and braking data corresponding to the acquired data, and output the drive data, the steering data, and the braking data to the drive control device 21, the steering control device 22, and the braking control device 23 through the vehicle network 30. At this occasion, the travel control device 24 may generate the drive data, the steering data, and the braking data corresponding to the operation data as they are, or alternatively, the travel control device 24 may generate the drive data, the steering data, and the braking data adjusted to assist with the operation. Moreover, the travel control device 24 may generate drive data, steering data, and braking data for automated travel that are not caused by an operation by the occupant.

The drive control device 21 may acquire the drive data from the vehicle network 30, and control unillustrated power sources of the automobile 2 such as an engine, a motor, and a transmission, to control magnitude and balance of a drive force of the automobile 2.

The steering control device 22 may acquire the steering data from the vehicle network 30, and control an unillustrated steering wheel motor of the automobile 2, to control a direction of travel.

The braking control device 23 may acquire the braking data from the vehicle network 30, and control an unillustrated braking member and an unillustrated motor of the automobile 2, to control braking of the automobile 2.

The communication control device 27 may communicate with one of the base stations 3 near the automobile 2 to establish a wireless communication path. The communication control device 27 may transmit and receive data to and from, for example, the server apparatus 5 with the use of the wireless communication path established between the communication control device 27 and the relevant one of the base stations 3.

To the call control device 28, a speaker 46 and a microphone 47 may be coupled. The speaker 46 and the microphone 47 are used by the occupant of the automobile 2 to make a call with, for example, the operator of the server apparatus 5.

To the detection control device 26, various sensor members provided in the automobile 2 may be coupled. FIG. 3 illustrates, as non-limiting examples of the sensor members, a speed sensor 51, an acceleration rate sensor 52, a vehicle outside camera 53, Lidar 54, the in-vehicle camera 55, and a GNSS receiver 56.

The speed sensor 51 may detect a speed of the automobile 2 traveling for movement.

The acceleration rate sensor 52 may detect an acceleration rate of the automobile 2 traveling for movement.

The vehicle outside camera 53 may include a camera that captures surroundings outside the automobile 2. For example, the vehicle outside camera 53 may include a 360-degree camera that captures the entire surroundings outside the automobile 2, or alternatively, the vehicle outside camera 53 may include multiple cameras that separately capture their respective portions of the surroundings outside the automobile 2.

The Lidar 54 may include a sensor that detects the surroundings outside the automobile 2 by using a signal such as infrared rays. The Lidar 54 may generate space data regarding an outside of the automobile 2 based on reflected waves of the infrared rays.

The GNSS receiver 56 may receive radio waves of GNSS satellites 110 illustrated in FIG. 1 and generate the current time and a current position of the automobile 2 in which the GNSS receiver 56 is provided. The GNSS satellites 110 may include a zenith satellite. The GNSS receiver 56 may also be configured to receive radio waves from a transmitter fixedly installed on the ground.

The in-vehicle camera 55 may include a camera that captures an inside of the automobile 2 in which the occupant such as the driver rides. Here, the in-vehicle camera 55 may include a wide-angle camera configured to capture the driver and the assistant riding in the automobile 2 in one image. Such a wide-angle camera configured to capture multiple occupants riding in the automobile 2 may be provided in a center portion of the automobile 2 in the vehicle widthwise direction, e.g., in a center portion of a dashboard.

The detection control device 26 may output detection data by the sensor members and data generated based on the detection data, to the other control devices through the vehicle network 30.

For example, the detection control device 26 may include a memory 64, and record, in advance, data regarding a captured image of the face of the occupant by the in-vehicle camera 55 in the memory 64. The detection control device 26 may compare the data with the currently captured image by the in-vehicle camera 55 to identify the occupant riding in the automobile 2. In this case, the detection control device 26 may output the data regarding the identified occupant to the other control devices through the vehicle network 30 as the data generated based on the detection data. Moreover, the detection control device 26 may repeatedly acquire the latest captured image by the in-vehicle camera 55 to monitor the state of the occupant. There is possibility that the occupant may feel ill while driving. Upon detecting such a change in the state of the occupant, the detection control device 26 may transmit a request for the emergency response from the communication control device 27 to the server apparatus 5. Such a detection control device 26 may serve as an occupant monitoring control device.

Figure 4:
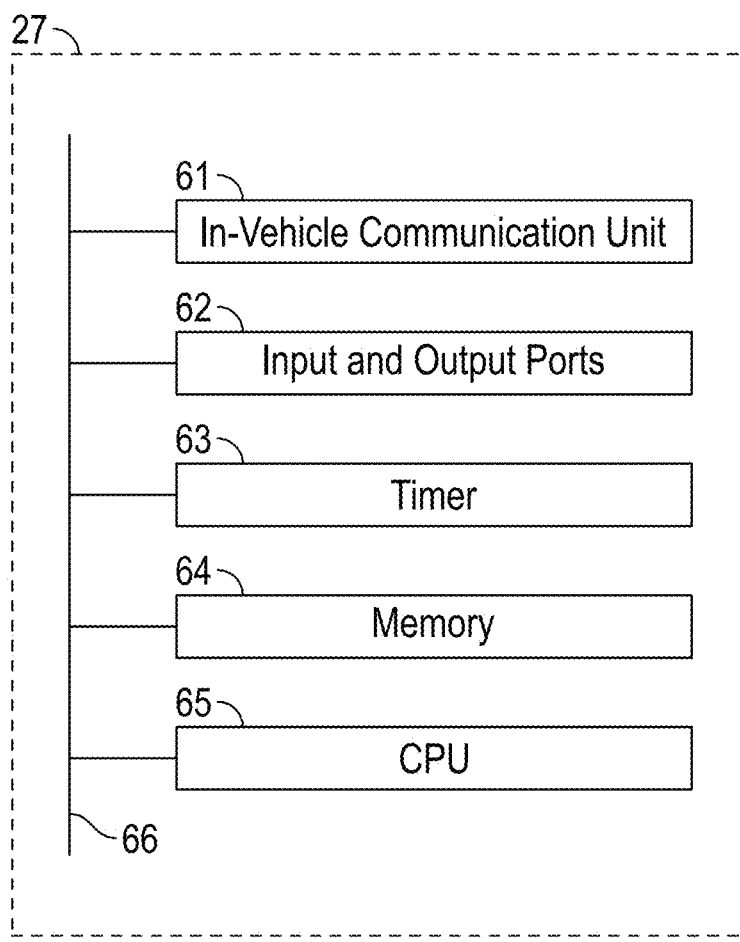
FIG. 4 is a basic configuration diagram of a communication control device in FIG. 3.

FIG. 4 illustrates a basic configuration of the communication control device 27 in FIG. 3.

The other control devices in FIG. 3 may have similar basic configurations to that in FIG. 4.

The communication control device 27 in FIG. 4 may include, for example, an in-vehicle communication unit 61, input and output ports 62, a timer 63, the memory 64, a CPU 65, and an inner bus 66 configured to couple them together.

The in-vehicle communication unit 61 may be coupled to the vehicle network 30. The in-vehicle communication unit 61 may be supplied with data from, and output data to, the in-vehicle communication units 61 of the other control devices through the vehicle network 30.

To the input and output ports 62, various members may be coupled. The various members are coupled to the communication control device 27. In the case of the communication control device 27, a communication unit for communication with the base stations 3 may be coupled to the communication control device 27.

The timer 63 may measure time or the time. The time to be measured by the timer 63 may be calibrated based on the current time to be acquired by the GNSS receiver 56. This contributes to highly precise matching between the time at the server apparatus 5 and the time at the automobile 2.

The memory 64 may hold programs to be executed by the CPU 65 and various kinds of data. The memory 64 may include, for example, a semiconductor memory and a hard disk drive (HDD), without limitation. Non-limiting examples of the semiconductor memory may include, for example, volatile memories such as a random access memory (RAM) and non-volatile memories such as a read only memory (ROM) and a solid state drive (SSD).

The CPU 65 may read the programs held in the memory 64 and execute the programs. Thus, in one embodiment of the disclosure, the CPU 65 may serve as "one or more vehicle processors" configured to control the entire operation of the communication control device 27 in which the CPU 65 is provided.

Figure 5:
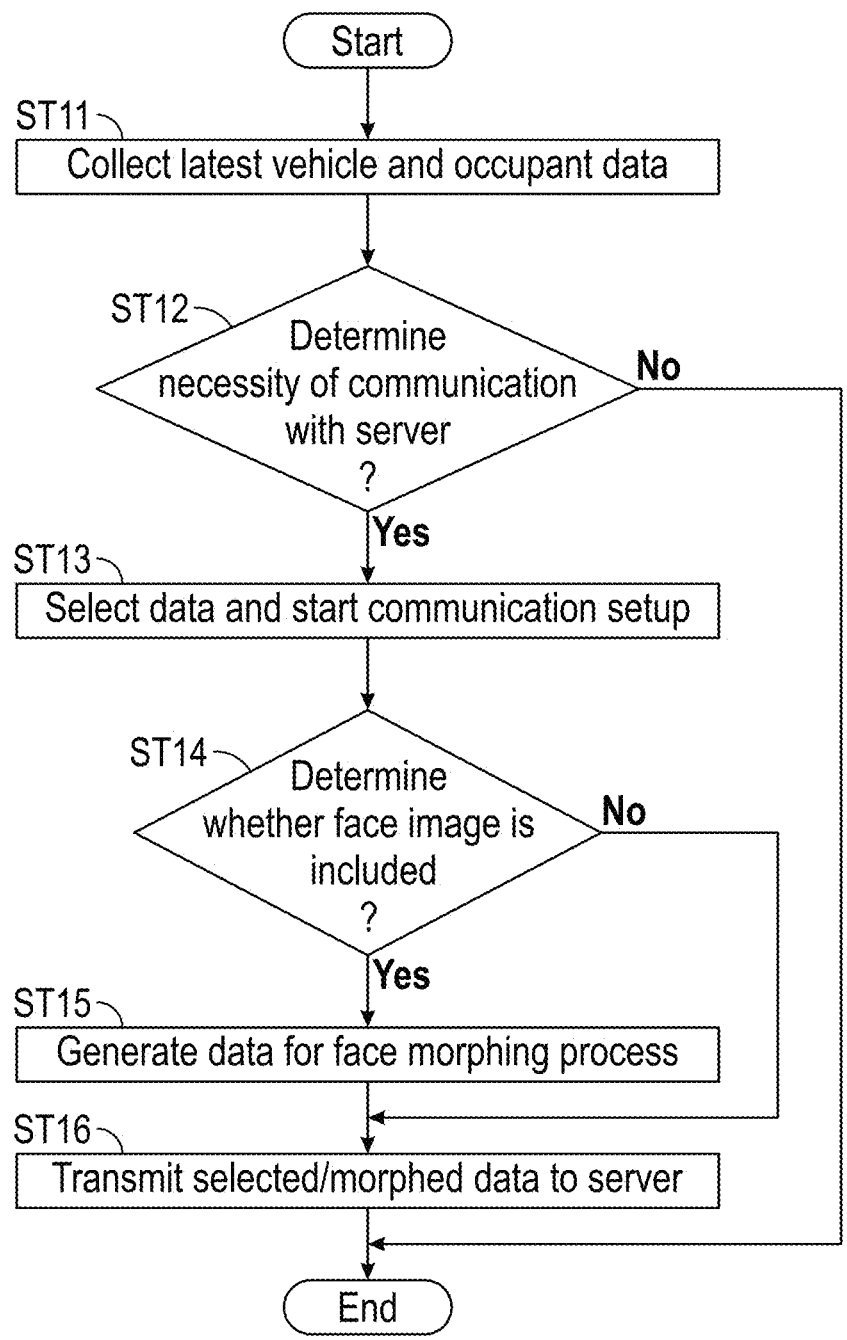
FIG. 5 is a flowchart of a data transmission control for the emergency response service, by the control system of the automobile in FIG. 3.

FIG. 5 is a flowchart of a data transmission control for the emergency response service, by the control system of the automobile in FIG. 3.

Here, description is given on an assumption that the CPU 65 of the communication control device 27 carries out the transmission control in FIG. 5. The CPU 65 of the communication control device 27 may repeatedly carry out the transmission control in FIG. 5, for example, with the occupant riding in the automobile 2.

It is to be noted that the CPU 65 of any one of the other various control devices included in the control system 20 of the automobile 2 in FIG. 3 may carry out the transmission control in FIG. 5. Moreover, the CPUs 65 of the control system 20 may cooperate to carry out the transmission control in FIG. 5.

In step ST11, the CPU 65 may collect latest vehicle data regarding the automobile 2. Here, the vehicle data may include any data to be collected from each unit of the automobile 2. The vehicle data may include, for example, data indicating a travel state or a malfunction of the automobile 2, and data indicating the state of the occupant or the illness of the occupant. The data indicating the state of the occupant may include, for example, the captured image by the in-vehicle camera 55. The captured image by the in-vehicle camera 55 may include the occupants of the automobile 2, e.g., the driver and the assistant riding in the automobile 2.

In step ST12, the CPU 65 may determine whether or not the state of the automobile 2 to be determined based on the vehicle data necessitates communication with the server apparatus 5. When the automobile 2 has a malfunction or the occupant seems to feel ill, when the automobile 2 is being involved in an unexpected incident, or when the occupant has made a request by, for example, operating an unillustrated button (Y in step ST12), the CPU 65 may determine, based on these pieces of data, that the communication with the server apparatus 5 is necessary. In this case, the CPU 65 may cause the flow to proceed to step ST13 to establish the communication with the server apparatus 5. When the CPU 65 does not determine that the communication with the server apparatus 5 is necessary (N in step ST12), the CPU 65 may end the control.

In step ST13, the CPU 65 may start processing to establish communication with the server apparatus 5. The CPU 65 may, first, select data to be transmitted from the latest vehicle data collected. When the automobile 2 has a malfunction, the CPU 65 may select various kinds of data regarding the automobile 2 as the data to be transmitted. When the occupant seems to feel ill, or when the occupant has operated the button, the CPU 65 may select various kinds of data regarding the occupant as the data to be transmitted. When the automobile 2 is being involved in an unexpected incident, the CPU 65 may select various kinds of data regarding the automobile 2 and the occupant as the data to be transmitted. When selecting various kinds of data regarding the occupant, the CPU 65 may sometimes select the captured image by the in-vehicle camera 55 including the face of the occupant.

In step ST14, the CPU 65 may determine whether or not a face image of the occupant has been selected as the data to be transmitted. For example, when the captured image by the in-vehicle camera 55 including the face of the occupant has been selected as the data to be transmitted, the CPU 65 may determine that the face image of the occupant has been selected (Y in step ST14), and cause the flow to proceed to step ST15. When the captured image by the in-vehicle camera 55 including the face of the occupant has not been selected as the data to be transmitted (N in step ST14), the CPU 65 may cause the flow to skip step ST15 and proceed to step ST16.

In step ST15, the CPU 65 may generate data to be used for a face morphing process based on the face image of the occupant, based on the image including the face of the occupant selected as the data to be transmitted.

In step ST16, the CPU 65 may transmit the data to be transmitted, from the communication control device 27 to the server apparatus 5 through the base stations 3.

When the data to be used for the face morphing process based on the face image of the occupant has been generated in step ST15, the CPU 65 may transmit the data to be used for the morphing process instead of the face image of the occupant.

At this occasion, the CPU 65 may also transmit data for the morphing process in the server apparatus 5, e.g., classification data regarding the occupant and the vehicle. The CPU 65 may acquire the data regarding the occupant and the vehicle from each unit of the control system 20 of the automobile 2, generate the classification data regarding the occupant and the vehicle, and transmit the classification data thus generated.

The classification data regarding the occupant and the vehicle to be used for the morphing process in the server apparatus 5 may include, at least, data with which the occupant is uniquely unidentifiable.

Such classification data regarding the vehicle with which the occupant is unidentifiable may include, for example, positional data regarding the automobile 2 of the occupant, and specification data regarding the vehicle, e.g., whether the steering wheel of the automobile 2 of the occupant is positioned on the left or whether the steering wheel of the automobile 2 of the occupant is positioned on the right.

The classification data regarding the vehicle of the occupant may include, for example, vehicle setting data corresponding to a physical constitution of the occupant. The vehicle setting data corresponding to the physical constitution of the occupant may include, for example, setting data regarding a position, a height, and an inclination of a seat of the occupant, setting data regarding a position and a height of the steering wheel, accelerator operation data, and personal setting data regarding the occupant in the automobile 2.

The classification data regarding the occupant themselves may include, for example, whether or not the occupant is wearing glasses, whether or not the occupant is wearing a hat, whether or not the occupant has a whisker, a gender of the occupant, a patterned hairstyle of the occupant, a hair color of the occupant in the limited number of patterned colors, a color of the eyeballs of the occupant in the limited number of patterned colors, and a skin color of the occupant in the limited number of patterned colors, without limitation. Each of these pieces of the classification data regarding the occupant is not data with which an individual is identifiable for itself. Even a combination of multiple pieces of the classification data does not make data with which the occupant is uniquely identifiable.

When the data to be used for the face morphing process based on the face image of the occupant has not been generated in step ST15, the CPU 65 may transmit the face image of the occupant to the server apparatus 5.

As described, the CPU 65 of the communication control device 27 of the automobile 2 is configured to refrain from transmitting the captured image by the in-vehicle camera 55 including the face image of the occupant to the outside of the vehicle. It is possible to protect the face image of the occupant as personal information.

Figure 6:
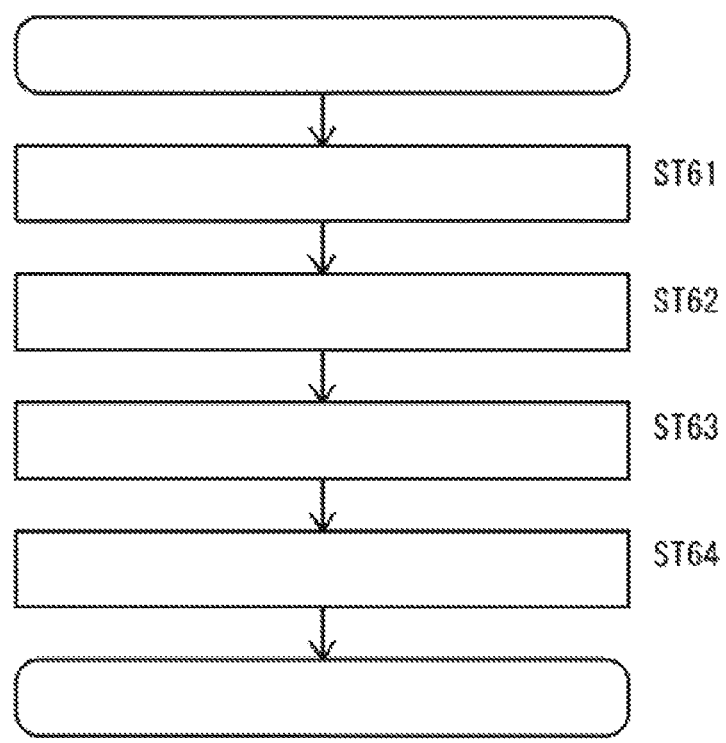
FIG. 6 is a detailed flowchart of a generation control of data for a morphing process in step ST15 in FIG. 5.

FIG. 6 is a detailed flowchart of a generation control of the data for the face morphing process in step ST15 in FIG. 5.

In step ST61, the CPU 65 may segment the face image, i.e., the captured region of the face of the occupant, from the captured image by the in-vehicle camera 55 already acquired as the vehicle data acquired from each unit of the automobile 2.

Here, the face image of the occupant refers to the image including the image component of the face of the occupant.

In step ST62, the CPU 65 may generate point group data regarding the segmented face image of the occupant. The point group data indicates the face of the occupant. Here, the point group data may include multiple points indicating a position of an outline of the face of the occupant in the face image of the occupant, and multiple points indicating positions of facial features such as the eyebrows, the eyes, the nose, and the mouth in the face of the occupant. In addition, for example, the point group data may include multiple points indicating a position of an outline of the entire head including the head of the occupant. Moreover, the multiple points indicating the positions of the facial features of the face may have a combination indicating a shape and a range of each of the facial features. For example, the multiple points for the eyebrows may include a combination indicating positions of both ends of each eyebrow and a position of the midpoint of each eyebrow. The multiple points for the eyes may include a combination indicating positions of the inner corners of the eyes, positions of the outer corners of the eyes, positions of the upper eyelids, and positions of the lower eyelids. The multiple points for the nose may include a combination indicating the upper end, the lower edge, and the left and right edges of the nose, and the apex of the nose. The multiple points for the mouth may include a combination indicating the outer circumference of the upper lip and the outer circumference of the lower lip.

The point group data regarding the multiple points in the face of the occupant may be generated by landmark detection processing.

In step ST63, the CPU 65 may generate patch data that separates the face image. At this occasion, the CPU 65 may generate the patch data that separates the face image, by using the point group data generated in step ST62 as a reference for image separation. The CPU 65 may generate multiple pieces of the patch data regarding the face image by, for example, the Droney method. In the Droney method, the face image may be separated into multiple parts to obtain triangular patches.

In step ST64, the CPU 65 may generate a brightness value of the face image of the occupant. The CPU 65 may generate, for example, an average brightness value and a representative brightness value of a portion of the face with respect to the face images of the occupant.

Thereafter, in step ST16 in FIG. 5, the CPU 65 may transmit, to the server apparatus 5, the data generated in steps ST62 and ST63 as the data to be used for the face morphing process based on the face image of the occupant. Instead of the captured image including the face of the occupant, the CPU 65 may transmit data regarding the point group data and the patch data generated by the processing, to the server apparatus 5 together with the classification data regarding the occupant or the vehicle with which the occupant is uniquely unidentifiable as described above.

Figure 7:
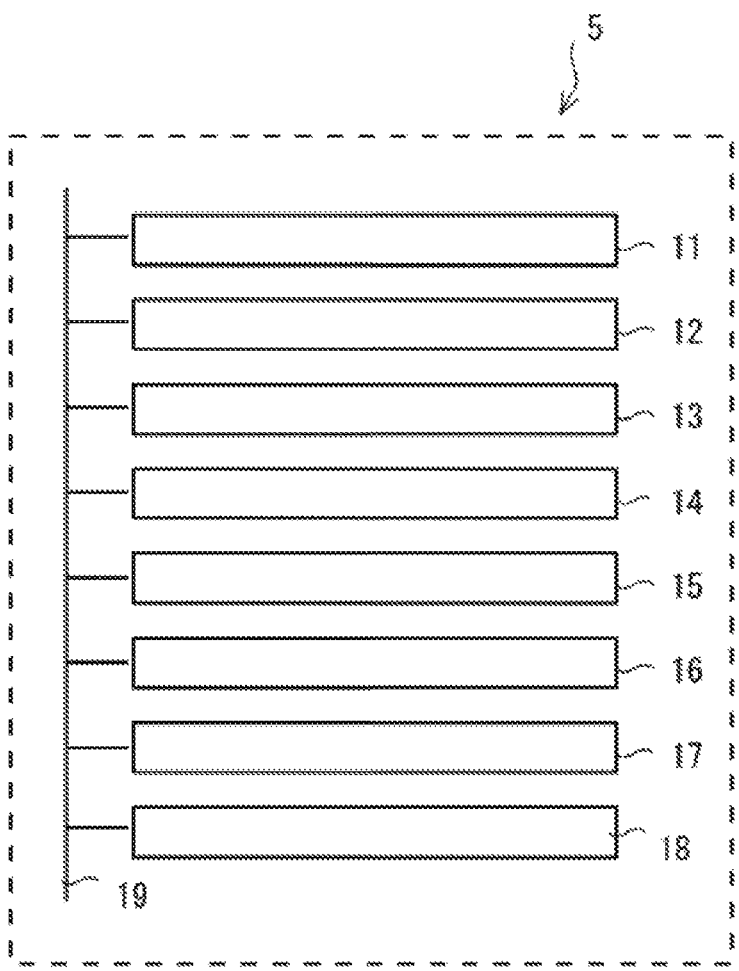
FIG. 7 is a configuration diagram of the server apparatus in FIG. 1.

FIG. 7 illustrates a configuration of the server apparatus 5 in FIG. 1.

The server apparatus 5 in FIG. 7 may include, for example, a server timer 16, a server memory 17, a server CPU 18, and a server bus 19 configured to couple them together. In addition, for example, a server GNSS receiver 11, a server communication device 12, a server display device 13, a server operation device 14, and a server audio device 15 may be coupled to the server bus 19.

The server communication device 12 may be coupled to the communication network 4 of the communication network system 6. The server communication device 12 may transmit and receive data to and from other devices coupled to the communication network 4, e.g., the automobile 2 and the base stations 3, through the communication network 4.

The server GNSS receiver 11 may receive the radio waves of the GNSS satellites 110 illustrated in FIG. 1 and obtain the current time.

The server display device 13 may output data from the server apparatus 5 by displaying the data. The server display device 13 may include, for example, a liquid crystal display monitor. In one embodiment of the disclosure, the server display device 13 may serve as an "output unit" of the server apparatus 5. The "output unit" is configured to output an image.

The server operation device 14 may include a device to be operated by the operator, in the server apparatus 5. The server operation device 14 may include, for example, a keyboard and a touchscreen, without limitation.

The server audio device 15 may include a device to be used by the operator to make a call, in the server apparatus 5. The server voice device 15 may include, for example, a speaker and a microphone.

The server timer 16 may measure time or the time. The time to be measured by the server timer 16 may be calibrated based on the current time to be acquired by the server GNSS receiver 11.

The server memory 17 may hold programs to be executed by the server CPU 18 and various kinds of data. The server memory 17 may include, for example, a semiconductor memory and an HDD, without limitation. Non-limiting examples of the semiconductor memory may include, for example, volatile memories such as a RAM and non-volatile memories such as a ROM and an SSD. The volatile memories temporarily hold data, and are suitable for holding, for example, personal information.

Moreover, in this embodiment, the server memory 17 may hold a face image group 90 including multiple sample face images described later, as the data for the morphing process in the server apparatus 5. The face image group 90 may include classification data regarding the sample face images, together with data regarding the multiple sample face images. The classification data regarding the sample face images is associated with the respective sample face images.

Here, the classification data regarding the sample face images may include classification data regarding random persons in the respective sample face images. The classification data regarding the random persons in the respective sample face images corresponds to the classification data regarding the occupant and the automobile 2 to be transmitted from the automobile 2.

Such classification data regarding the random persons in the sample face images may include, for example, data regarding regions to which the random persons belong, and vehicle specification data in the relevant regions.

Moreover, classification data regarding the vehicles of the random persons may include, for example, vehicle setting data corresponding to physical constitutions of the random persons. The vehicle setting data corresponding to the physical constitutions of the random persons may include, for example, setting data regarding positions, heights, and inclinations of seats of the random persons, setting data regarding positions and heights of steering wheels, accelerator operation data, and personal setting data regarding the random persons in the vehicles.

Furthermore, classification data regarding the random persons themselves may include, for example, whether or not each of the random persons is wearing glasses, whether or not each of the random persons is wearing a hat, whether or not each of the random persons has a whisker, a gender of each of the random persons, a patterned hairstyle of each of the random persons, a hair color of each of the random persons in the limited number of patterned colors, a color of the eyeballs of each of the random persons in the limited number of patterned colors, and a skin color of each of the random persons in the limited number of patterned colors, without limitation.

Each of these pieces of the classification data regarding the random persons is not data with which the random persons are uniquely identifiable for itself. Even a combination of multiple pieces of the classification data does not make the data with which the random persons are uniquely identifiable.

The classification data regarding the random persons in the respective sample face images may include all or part of the various kinds of the data described above.

The server CPU 18 may read the programs held in the server memory 17 and execute the programs. Thus, in one embodiment of the disclosure, the server CPU 18 may serve as "one or more server processors" configured to control the entire operation of the server apparatus 5.

The server CPU 18 serving as the "one or more server processors" may perform, for example, a management control to allow the server memory 17 to temporarily hold personal information. For example, the server CPU 18 may delete personal information from the server memory 17 after an end of provision of the vehicle service related to the relevant personal information.

Moreover, the server CPU 18 may perform a management control of data transmission and reception to and from the automobile 2 with the use of the server communication device 12. For example, when the server communication device 12 receives data from the automobile 2, the server CPU 18 may perform a control in accordance with the received data, e.g., a control for the vehicle service. The server CPU 18 may output the face image based on the face of the occupant by displaying the face image on the server display device 13. In one embodiment of the disclosure, the server display device 13 may serve as the "output unit" configured to output an image. This makes it possible for the server apparatus 5 to receive the data from the automobile 2 and provide the vehicle service based on the received data.

Figure 8:
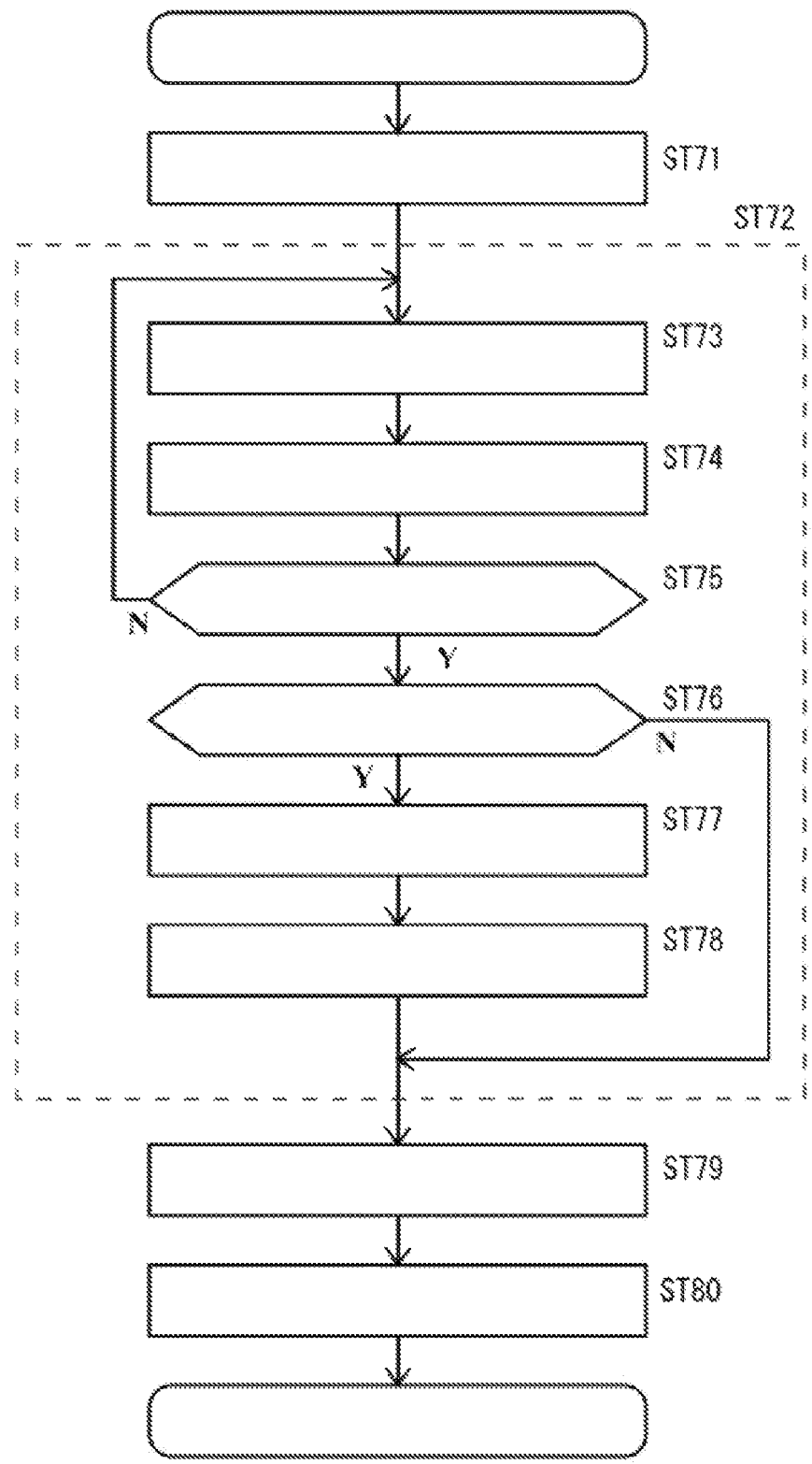
FIG. 8 is a flowchart of a generation control of a processed image for the emergency response service, by a server CPU of the server apparatus in FIG. 7.

FIG. 8 is a flowchart of a generation control of a processed image for the emergency response service, by the server CPU 18 of the server apparatus 5 in FIG. 7.

The server CPU 18 of the server apparatus 5 may repeatedly carry out the generation control of the processed image in FIG. 8. In one embodiment of the disclosure, the server CPU 18 may serve as the "one or more server processors".

In step ST71, the server CPU 18 may acquire morphing process data.

In step ST16 in FIG. 5, the CPU 65 of the automobile 2 may transmit the data to be used for the face morphing process based on the face image of the occupant, to the server apparatus 5. The server communication device 12 of the server apparatus 5 may receive the data to be used for the morphing process. The data to be used for the morphing process may include, together with the point group data and the patch data regarding the face of the occupant, the classification data regarding the occupant or the vehicle with which the occupant is uniquely unidentifiable. The server CPU 18 may acquire the classification data regarding the occupant or the vehicle as the morphing process data.

In step ST72, the server CPU 18 may start a selection process of the sample face image to be used for the morphing process.

In step ST73, the server CPU 18 may set a condition of acquisition of the sample face image from the face image group 90 held in the server memory 17. The servers CPU 18 may set the classification data regarding the occupant or the vehicle acquired from the automobile 2 in step ST71, to the condition of acquisition of the sample face image.

The server CPU 18 may set the data included in the classification data regarding the occupant or the vehicle, to the condition of acquisition of the sample face image. For example, the server CPU 18 may set the positional data regarding the automobile 2 of the occupant, the specification data regarding whether the steering wheel of the automobile 2 of the occupant is disposed on the right or whether the steering wheel of the automobile 2 of the occupant is disposed on the left, and the vehicle setting data corresponding to the physical constitution of the occupant, to the condition of acquisition of the sample face image.

Moreover, the server CPU 18 may set the classification data regarding the occupant themselves included in the classification data regarding the occupant or the vehicle, to the condition of acquisition of the sample face image.

In step ST74, the server CPU 18 may acquire the sample face image from the face image group 90 in the server memory 17 under the condition of acquisition thus set. This makes it possible for the server CPU 18 to select, for example, the sample face image associated with data corresponding to the received positional data regarding the vehicle of the occupant or data corresponding to the received specification data regarding the vehicle, from among the sample face images held in the server memory 17.

In step ST75, the server CPU 18 may determine whether or not to end the acquisition process of the sample face image from the face image group 90 in the server memory 17. When the process has been finished for all the sample face images included in the face image group 90 in the server memory 17 (Y in step ST75), the server CPU 18 may determine that the acquisition process of the sample face image is to be ended. Alternatively, when the predetermined number of the sample face images has been selected from the face image group 90 in the server memory 17 (Yin step ST75), the server CPU 18 may determine that the acquisition process of the sample face images is to be ended. When the server CPU 18 does not determine that the acquisition process is to be ended (N in step ST75), the server CPU 18 may cause the flow to return to step ST73. The server CPU 18 may repeat the processes of steps ST73 to ST75. When the server CPU 18 determines that the acquisition process of the sample face image is to be ended (Y in step ST75), the server CPU 18 may cause the flow to proceed to step ST76. In this case, the server CPU 18 may basically select the multiple sample face images associated with the data corresponding to the received classification data regarding the occupant or the vehicle, from the face image group 90 in the server memory 17.

In step ST76, the server CPU 18 may determine whether or not the multiple sample face images have been acquired from the face image group 90 in the server memory 17. When the multiple sample face images have been selected (Y in step ST76), the server CPU 18 may cause the flow to proceed to step ST77. When the single sample face image has been selected (N in step ST76), the server CPU 18 may end the selection process of the sample face image to be used for the morphing process, and cause the flow to proceed to step ST79.

In step ST77, the server CPU 18 may determine a degree of similarity to the face image of the occupant with respect to the multiple sample face images acquired from the face image group 90 in the server memory 17. The server CPU 18 may compare brightness values of the acquired multiple sample face images with the brightness value of the face image of the occupant included in the classification data regarding the occupant, to determine the degree of similarity to the face image of the occupant.

In step ST78, the server CPU 18 may select the single sample face image to be used for the morphing process, from the multiple sample face images acquired from the face image group 90 in the server memory 17. In the process of step ST77, the server CPU 18 may select the sample face image determined as having the highest degree of similarity to the face image of the occupant, as the single sample face image to be used for the morphing process. Thus, the server CPU 18 may end the selection process of the sample face image to be used for the morphing process.

As described, when the multiple sample face images have been selected with the use of the classification data regarding the occupant or the vehicle with which the occupant is uniquely unidentifiable, the server CPU 18 may further select the single sample face image to be used for the morphing process, based on the degree of similarity of the brightness values of the face images.

In step ST79, the server CPU 18 may carry out the morphing process on the sample face image. The server CPU 18 may carry out the morphing process with the use of the point group data and the patch data regarding the selected sample face image, and the point group data and the patch data received regarding the occupant, to generate a morphed face image.

In step ST80, the server CPU 18 may output the morphed face image generated by the morphing process by displaying the morphed face image on the server display device 13.

Description is given next of a series of processes described above, with the use of an example of the face image of the occupant and the sample face images.

Figure 9:
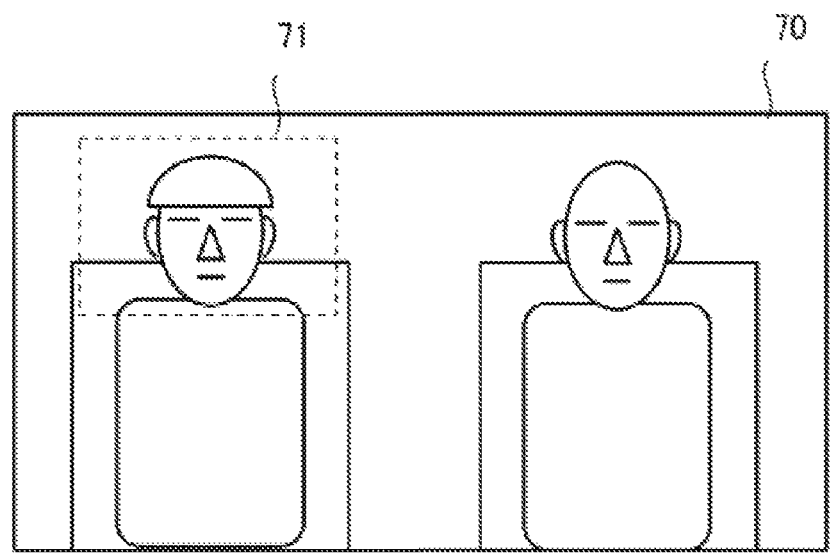
FIG. 9 illustrates an example of a captured image by an in-vehicle camera in FIG. 3.

FIG. 9 illustrates an example of the captured image 70 by the in-vehicle camera 55 in FIG. 3.

Because the in-vehicle camera 55 in FIG. 3 is a wide-angle camera, the captured image 70 by the in-vehicle camera 55 in FIG. 9 includes multiple occupants riding in the automobile 2, e.g., the driver and the assistant. The head of each occupant may move in the vehicle, but the entire head of each occupant fits in the captured image 70.

In this case, in step ST61 in FIG. 7, the CPU 65 may segment, for example, the captured region including the face of the driver denoted by a frame of a broken line in the figure, as a face image 71 of the driver.

Figure 10:
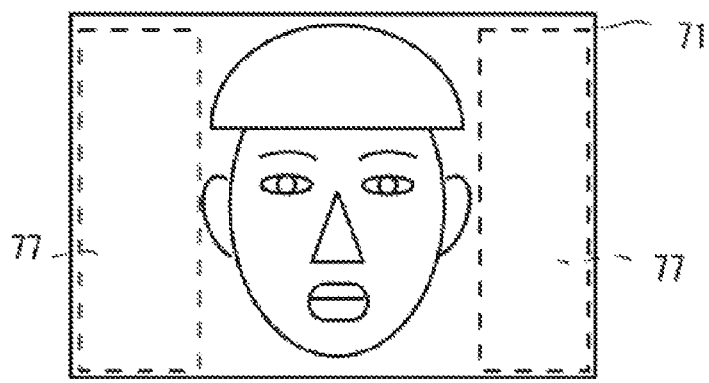
FIG. 10 illustrates an example of a face image as a captured region of the face of a driver segmented from the captured image in FIG. 9.

FIG. 10 illustrates an example of the face image 71 as the captured region of the face of the driver segmented from the captured image 70 in FIG. 9.

In the face image 71 of the driver in FIG. 10, the entire head of the driver fits without being trimmed by an outer peripheral edge of the image.

It is to be noted that the CPU 65 may segment not the entire head of the driver but a region from the eyebrows to the jaw tip of the driver, as the face image 71 of the driver. Even in this case, the face image 71 of the driver includes the image component of the face of the driver. As described later, the CPU 65 is configured to generate the point group data regarding the facial features in the region from the eyebrows to the jaw tip in the face of the driver.

However, even when the head of the driver is trimmed in this way, the CPU 65 may segment a portion of the face of the driver as the face image 71 of the driver, to leave margins 77 of a predetermined width on the right and left sides of the face of the driver. The margins 77 are useful in a processing process described later.

Figure 11:
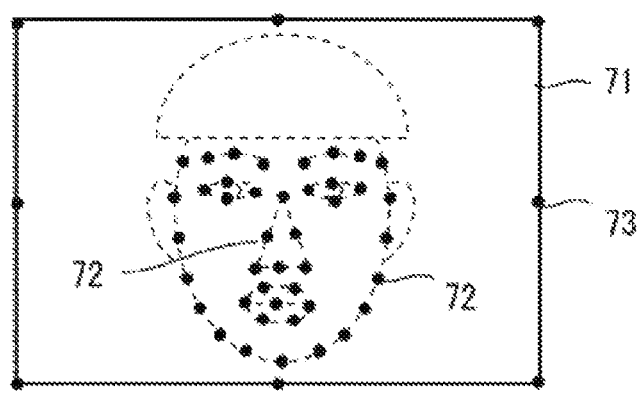
FIG. 11 illustrates an example of point group data to be generated with respect to the face image of the driver in FIG. 10.

FIG. 11 illustrates an example of the point group data to be generated with respect to the face image 71 of the driver in FIG. 10.

In step ST62 in FIG. 6, the CPU 65 is configured to generate the point group data as illustrated in FIG. 11 with respect to the face image 71 of the driver in FIG. 10.

The point group data in FIG. 11 may include points 72 for the face itself, and points 73 for the outer peripheral edge as an outline of the face image itself. The points 72 may include points indicating a position of the outline of the face of the driver, and points indicating the positions of the facial features, e.g., the eyebrows, the eyes, the nose, and the mouth in the face of the driver.

Here, the points 73 for the outer peripheral edge of the image may be provided at each corner of the outer peripheral edge of the rectangular image, and a midpoint of each side of the rectangular image.

Because the face image 71 of the driver includes the margins 77 on the right and left sides of the face of the driver, the points 73 for the outer peripheral edge of the image may be spaced away from the points 72 for the face of the driver itself.

Moreover, the points 73 for the outer peripheral edge of the image may be arranged to surround and enclose the points 72 for the face of the driver itself.

Figure 12:
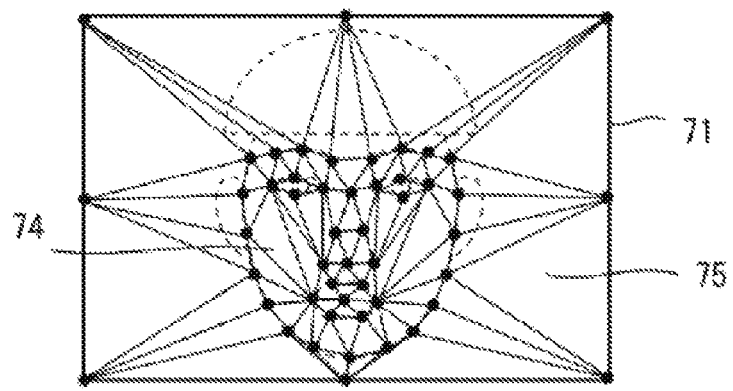
FIG. 12 illustrates an example of patch data to be generated with respect to the face image of the driver in FIG. 10.

FIG. 12 illustrates an example of the patch data to be generated with respect to the face image 71 of the driver in FIG. 10.

In the patch data in FIG. 12, each patch has a triangle shape.

In step ST63 in FIG. 6, the CPU 65 may generate the patch data in FIG. 12 with respect to the face image 71 of the driver in FIG. 10 by the Droney method.

The patch data in FIG. 12 may include patches 74 for the face of the driver itself and patches 75 outside the face of the driver. The CPU 65 is configured to separate the entire face image into multiple triangular patches as illustrated in FIG. 12 by a process of the Droney method using the points 72 for the face of the driver itself and the points 73 arranged along the outer peripheral edge of the image. The presence of the margins 77 on the left and right sides of the face image 71 of the driver makes it possible for the CPU 65 to separate the entire face image into the triangular patches without affecting the separation of the face itself into the patches.

Figure 13:
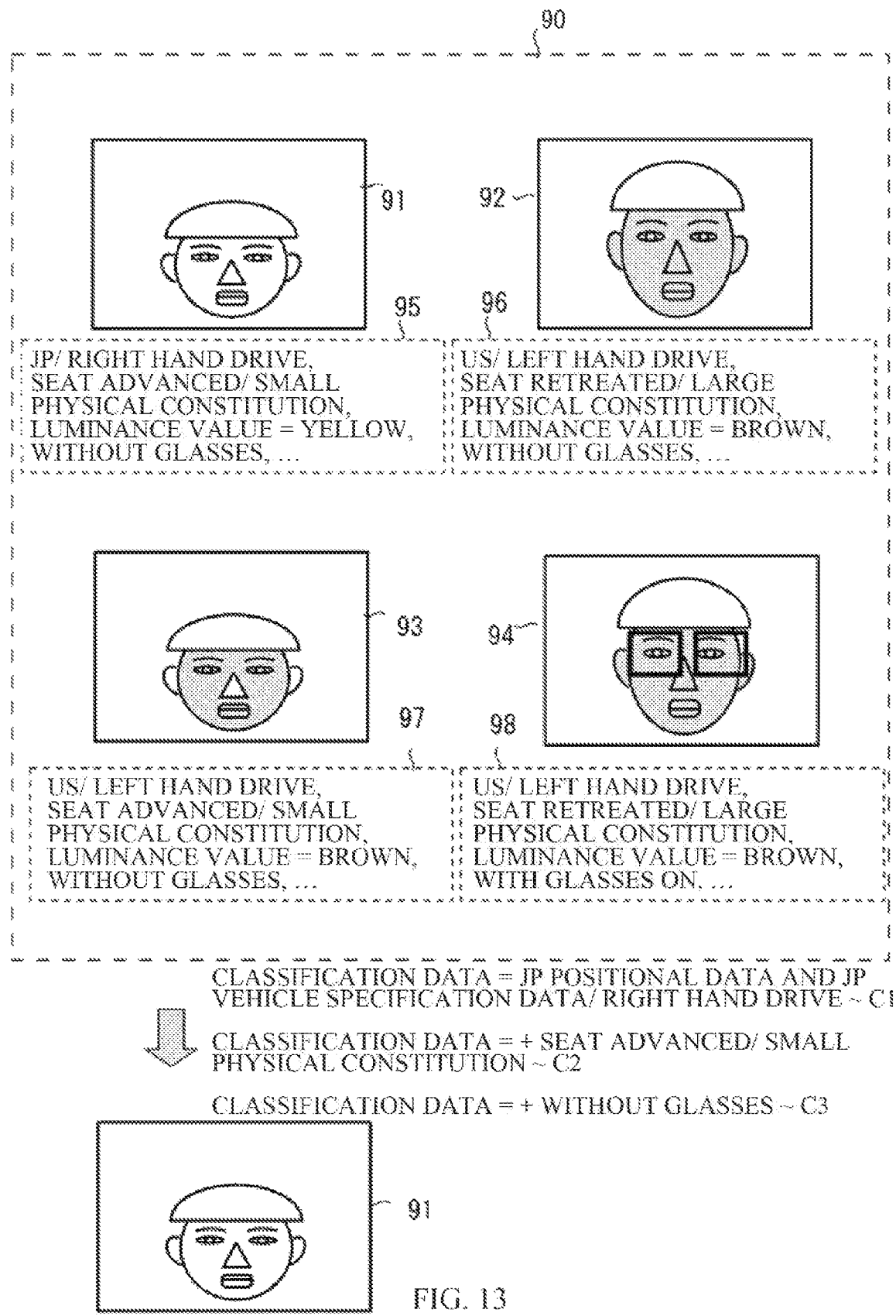
FIG. 13 illustrates an example of a combination of sample face images.

In contrast, for example, if there are no margins 77 on the left and right sides of the face image 71 of the driver, the CPU 65 may easily separate the face image into patches by the Droney method differently from FIG. 12. For example, the CPU 65 may carry out the separation assuming that the points on the right and left outer peripheral edges of the image are part of the outline of the face. This results in high possibility of unfavorable patch separation as the patch data regarding the face. To avoid such a situation, in this embodiment, as illustrated in FIGS. 10 and 13 described later, the CPU 65 may segment the face image, to allow a width of the face to be about one third (⅓) of a width of the face image. For example, the CPU 65 may provide a margin of a width of at least 25% or more of the width of the face image on each of the left and right sides of the face. This makes it possible for the CPU 65 to generate the optimal patch data regarding the face as illustrated in FIG. 12 by the Droney method. The CPU 65 may be configured to segment, as the captured region of the face of the driver, a captured region larger than the face of the driver at least in a widthwise direction of the face of the driver.

As described, in the segmentation process, the CPU 65 is configured to segment the captured region larger than the face of the occupant at least in the widthwise direction of the face of the occupant, from the captured image 70 acquired from the in-vehicle camera 55, to generate the face image as the captured region of the face of the occupant. In the point group generation process, the CPU 65 is configured to generate the point group data regarding the outer peripheral edge of the segmented captured region of the face of the occupant. The point group data includes multiple points along the outer peripheral edge including the position spaced away from the face of the occupant. In the patch generation process, the CPU 65 is configured to generate the patch data with the use of the point group data regarding the points along the outer peripheral edge of the segmented captured region of the face of the occupant, together with the point group data regarding the face indicating the position of the outline of the face and the positions of the facial features of the face, as the reference of the image separation. The patch data separates the segmented captured region of the face of the occupant into triangle-based units. The CPU 65 is configured to generate these pieces of data to be used for the morphing process for the occupant and transmit the generated data to the server apparatus 5 together with the classification data regarding the occupant or the vehicle with which the occupant is uniquely unidentifiable.

Figure 14:
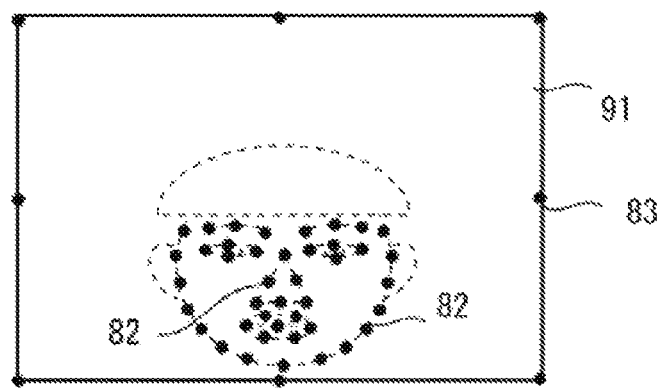
FIG. 14 illustrates an example of point group data to be generated with respect to a selected one of the sample face images in FIG. 13.
Figure 15:
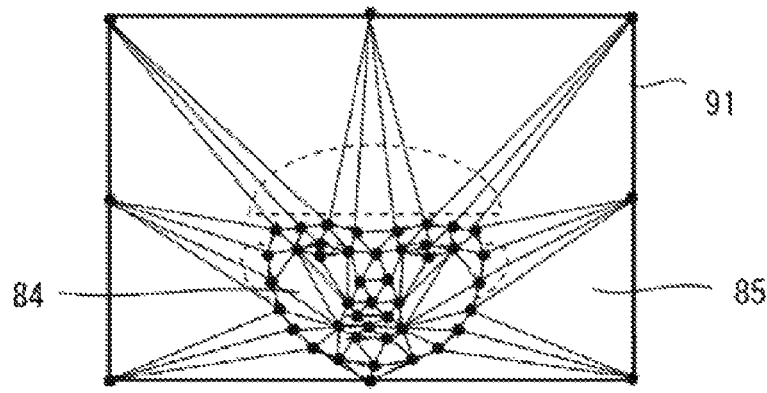
FIG. 15 illustrates an example of patch data to be generated with respect to the selected one of the sample face images in FIG. 13.

Description is given next, with reference to FIGS. 13 to 15, of the data regarding the sample face images 91 to be acquired by the CPU 15 in step ST74 in FIG. 8.

FIG. 13 illustrates an example of a combination of sample face images 91 to 94.

The sample face images 91 to 94 may be held in the server memory 17 as the face image group 90.

In the face image group 90 held in the server memory 17, face images of random persons may be held as the sample face images 91 to 94.

In one example, FIG. 13 illustrates the sample face image 91 of a first random person having the fair round face, the sample face image 92 of a second random person having the dark-skinned long face, the sample face image 93 of a third random person having the dark-skinned round face, and the sample face image 94 of a fourth random person wearing glasses and having the dark-skinned long face.

The sample face images 91 to 94 may respectively include classification data 95 to 98 regarding the random persons included in the images.

The classification data 95 to 98 regarding the random persons may include classification data regarding the random persons in the sample images. The classification data regarding the random persons in the sample images corresponds to the classification data regarding the occupant and the automobile 2 to be transmitted from the automobile 2.

For example, the classification data 95 regarding the sample face image 91 of the first random person having the fair round face may include, without limitation: that the first random person is a resident of Japan; that the first random person has a small physical constitution and the seat position is advanced; that the brightness value of the face is yellow; and that the first random person is not wearing glasses. The automobile 2 sold in Japan is right hand drive.

The classification data 96 regarding the sample face image 92 of the second random person having the dark-skinned long face may include, without limitation: that the second random person is a resident of the United States: that the second random person has a large physical constitution and the seat position is retreated; that the brightness value of the face is brown; and that the second random person is not wearing glasses. The automobile 2 sold in the United States is left hand drive.

The classification data 97 regarding the sample face image 93 of the third random person having the dark-skinned round face may include, without limitation: that the third random person is a resident of the United States; that the third random person has a small physical constitution and the seat position is advanced; the brightness value of the face is brown; and that the third random person is not wearing glasses.

The classification data 98 regarding the sample face image 94 of the fourth random person having the dark-skinned long face who is wearing glasses may include, without limitation: that the fourth random person is a resident of the United States; that the fourth random person has a large physical constitution and the seat position is retreated; that the brightness value of the face is brown; and that the fourth random person is wearing glasses.

While such data regarding the face image group 90 is held in the server memory 17, in step ST71, the server CPU 18 may receive and acquire, from the automobile 2, the classification data regarding the occupant or the vehicle as the data to be used for the morphing process.

As illustrated in the figure, classification data C1 regarding the occupant or the vehicle may include the positional data in Japan regarding the automobile 2 of the occupant and the data indicating that the automobile 2 is right hand drive as the specification data regarding the automobile 2 destined for Japan.

In this case, the server CPU 18 may select at least the sample face image 91 of the first random person having the fair round face, from the data regarding the face image group 90 in FIG. 13 with the use of the positional data and the specification data regarding the automobile 2 of the occupant.

As described, the server CPU 18 may select the sample face image 91 associated with the data corresponding to the received positional data or the received specification data regarding the automobile 2 of the occupant, from among the sample face images 91 to 94 held in the server memory 17.

Moreover, as illustrated in the figure, classification data C2 regarding the occupant or the vehicle may include, in addition to the data regarding the classification data C1, data indicating that the seat position is advanced, as the data regarding the setting position of the seat in accordance with the physical constitution of the occupant.

In this case, the server CPU 18 may select at least the sample face image 91 of the first random person having the fair round face, from the data regarding the face image group 90 in FIG. 13 with the use of the setting position of the seat in addition to or in place of the positional data and the specification data regarding the automobile 2 of the occupant.

As described, the server CPU 18 may select the sample face image 91 associated with the data corresponding to the received setting data regarding the automobile 2 in accordance with the physical constitution of the occupant, from among the sample face images 91 to 94 held in the server memory 17.

Furthermore, as illustrated in the figure, classification data C3 regarding the occupant or the vehicle may include, in addition to the data in the classification data C2, data indicating that the occupant is not wearing glasses.

In this case, the server CPU 18 may select at least the sample face image 91 of the first random person having the fair round face, from the data regarding the face image group 90 in FIG. 13 with the use of the data regarding the presence or absence of the glasses in addition to or in place of the positional data and the specification data regarding the automobile 2 of the occupant, and the setting position of the seat.

As described, the server CPU 18 may select the sample face image 91 associated with the data corresponding to the received classification data regarding the occupant, from among the sample face images 91 to 94 held in the server memory 17.

FIG. 14 illustrates an example of the point group data to be generated with respect to the sample face image 91 selected in FIG. 13.

FIG. 15 illustrates an example of the patch data to be generated with respect to the sample face image 91 selected in FIG. 13.

In FIG. 13, the entire head of the first random person fits in the sample face image 91 of the first random person, with a margin around the head, without being trimmed by an outer peripheral edge of the image.

In this case, as illustrated in FIG. 14, the server CPU 18 may generate the point group data regarding the sample face image 91 of the first random person by a point group generation process for the sample face image 91 of the first random person. The point group data regarding the sample face image 91 of the first random person may include points 82 for the face itself and points 83 along the outer peripheral edge of the face image. The points 82 indicate the outline of the face and the positions of the facial features of the face.

Moreover, as illustrated in FIG. 15, the server CPU 18 may generate the patch data by a patch generation process for the sample face image 91 of the first random person. The patch data separates the sample face image 91 of the first random person into triangle-based units. The patch data may include patches 84 and patches 85. The patches 84 separate the face of the random person itself. The patches 85 separate an outside of the face of the random person.

The server CPU 18 may generate the point group data in FIG. 14 and the patch data in FIG. 15 regarding the sample face image 91 of the first random person in FIG. 13 by a similar process to the process for the face image 71 of the driver in FIG. 10.

Figure 16:
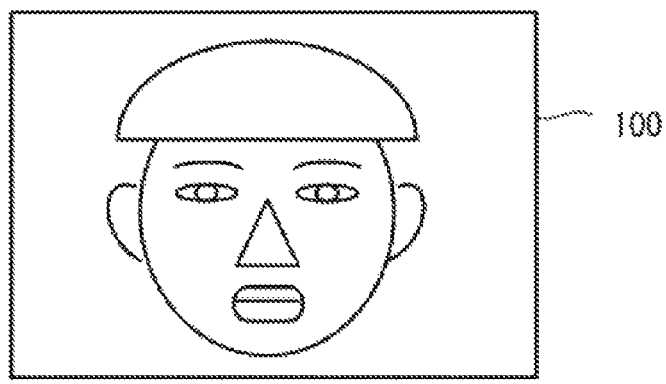
FIG. 16 illustrates an example of a morphed face image to be outputted and displayed instead of the face image of an occupant.

FIG. 16 illustrates an example of a morphed face image 100 to be outputted and displayed in place of the face image of the occupant. The morphed face image 100 is an image to be outputted to and displayed on the server apparatus 5 instead of the face image 71 of the driver.

In step ST79 in FIG. 8, the server CPU 18 may carry out the morphing process on the sample face image 91 of the first random person.

In the morphing process, the server CPU 18 may use the data in FIGS. 13 to 15 regarding the sample face image 91 and the data in FIGS. 10 to 12 regarding the face image 71 of the driver.

The points 72 and 73 included in the point group data regarding the face image 71 of the driver in FIG. 11 and the points 82 and 83 included in the point group data regarding the sample face image 91 in FIG. 14 correspond to each other.

The patches 74 and 75 included in the patch data regarding the face image 71 of the driver in FIG. 12 and the patches 84 and 85 included in the patch data regarding the sample face image 91 in FIG. 15 correspond to each other.

As described, the point group data and the patch data regarding the sample face image 91 are generated to optimally correspond to the point group data and the patch data regarding the face image 71 of the driver.

In this case, for example, the server CPU 18 may bring the positions in the image of the points 82 and 83 in the point group data regarding the sample face image 91 closer to the positions in the image of the corresponding points 72 and 73 in the point group data regarding the face image 71 of the driver.

Thus, the position and a range in the image of each of the patches 84 and 85 in the patch data regarding the sample face image 91 change to be superposed on the position and a range in the image of each of the patches 74 and 75 in the patch data regarding the face image 71 of the driver.

As a result, the face of the first random person in the sample face image 91 of the first random person in FIG. 13 comes to resemble the face of the driver in the image 71 in FIG. 10.

As described, the server CPU 18 may carry out the morphing process on the sample face image 91 to bring the point group data and the patch data regarding the sample face image 91 closer to the point group data and the patch data regarding the face image 71 of the driver.

Here, when the positions in the image of the points 82 and 83 in the point group data regarding the sample face image 91 are superposed respectively on the positions in the image of the points 72 and 73 in the point group data regarding the face image 71 of the driver, the sample face image 91 of the first random person is morphed at a rate of 100%. The possibility is that the outline of the face, the positions and sizes of the facial features of the face in the sample face image 91 are substantially the same in position and size as those in the actual face image 71 of the driver. However, because the sample face image 91 itself to be used for the morphing process is not the one of the driver, but is of a different person, even if the morphing process is performed at the rate of 100%, the morphed face image 100 does not become the face image 71 itself of the driver. When the ratio of morphing is 50%, as illustrated in FIG. 16, the morphed face image 100 becomes an intermediate between the face of the driver in the image 71 in FIG. 10 and the face of the random person in the sample face image 91 in FIG. 13. Even in this case, the morphed face image 100 includes features and expression of the face of the driver at the ratio of morphing.

The server CPU 18 may carry out the morphing process, with the ratio of morphing of the sample face images 91 assuming any value. The value of the ratio of morphing may be fixed, or alternatively, the ratio of morphing may be set at any value by, for example, the driver.

As described, in the vehicle service providing system 1 of this embodiment, the CPU 65 of the automobile 2 of the occupant and the server CPU 18 of the server apparatus 5 are configured to cooperate to carry out the occupant image acquisition process, the segmentation process, the point group generation process, the patch generation process, the sample face image acquisition process, and the morphing process. The server CPU 18 is configured to allow the output unit of the server apparatus 5 to output the morphed face image by the morphing process instead of the face image of the occupant. Thus, the output unit of the server apparatus 5 is configured to output the face image that reflects the state of the occupant, e.g., the expression of the occupant. This makes it possible for the operator to grasp, for example, the current actual state or the expression of the occupant based on the face image thus outputted.

In contrast, for example, if the face image of the occupant is abstracted, substituted, or masked, it is difficult for the operator to accurately grasp, for example, the current actual state or the expression of the occupant based on the face image outputted on the server apparatus 5.

Moreover, the CPU 65 of the automobile 2 of the occupant is configured to carry out the occupant image acquisition process, the segmentation process, the point group generation process, and the patch generation process. The CPU 65 of the automobile 2 of the occupant is configured to transmit the data generated by these processes to the server apparatus 5 instead of the captured image including the face of the occupant. Hence, in the automobile 2 of this embodiment, it is possible to refrain from transmitting the face image of the occupant itself to the outside. The face image of the occupant deserves protection as personal information regarding the occupant.

As described, in this embodiment, it is possible to protect personal information without imparting the convenience of the vehicle service providing system 1.

Moreover, in this embodiment, the server apparatus 5 includes, together with the output unit, the server memory 17 and the server CPU 18. The output unit is configured to output an image. The server memory 17 is configured to hold the data regarding the sample face images 91 to 94. The sample face images 91 to 94 include the points 82 and 83 in the point group data, and the patches 84 and 85 in the patch data, as the data regarding the face images of the random persons different from the occupant to be segmented from the captured image. The sample face images 91 to 94 are associated respectively with the classification data 95 to 98 regarding the sample face images. The server CPU 18 is configured to select one or more of the sample face images associated with the data corresponding to the classification data C1 to C3 regarding the occupant or the vehicle, from among the sample face images 91 to 94 held in the server memory 17, with the use of the classification data C1 to C3 regarding the occupant or the vehicle with which the occupant is uniquely unidentifiable. The classification data C1 to C3 is received from the CPU 65 of the automobile 2 of the occupant.

In such a server apparatus 5, the server memory 17 is configured to hold a large number of the sample face images that are optimally used for each occupant.

Even when the server memory 17 holds a large number of the sample face images, it is possible for the server CPU 18 to narrow and select, in short time, the sample face image to be used for the morphing process, by an easy, small-load process, i.e., the selection process based on the classification data C1 to C3 regarding the occupant or the vehicle. It is possible for the server CPU 18 to select the sample face image that optimally correspond to the occupant, without carrying out a high-load process on all of a large number of the sample face images held in the server memory 17, e.g., making comparison and selection based on, for example, the degree of similarity of the brightness value of the face. It is possible for the server CPU 18 to select the sample face image for the morphing process in short time by a smaller-load process. When the random person in the sample face image optimally corresponds to the occupant, the possibility is that the morphed face image to be obtained based on the sample face image of the random person resembles the occupant as compared to a case where they do not optimally correspond to each other.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The CPU 65 of the automobile 2 and the server CPU 18 of the server apparatus 5 illustrated in FIGS. 4 and 7 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the CPU 65 of the automobile 2 and the server CPU 18 of the server apparatus 5. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the CPU 65 of the automobile 2 and the server CPU 18 of the server apparatus 5 illustrated in FIGS. 4 and 7.

The invention claimed is:

1. A vehicle service providing system comprising a vehicle and a server apparatus, the vehicle being configured to transmit data to the server apparatus, and the server apparatus being configured to provide a service based on the data received, the vehicle comprising an in-vehicle camera and one or more vehicle processors, the in-vehicle camera being configured to capture an image of an occupant of the vehicle, the server apparatus comprising an output unit, one or more server memories, and one or more server processors, the output unit being configured to output an image, the one or more vehicle processors being configured to:
acquire a captured image including a face of the occupant, from the in-vehicle camera;
segment a captured region of the face of the occupant from the captured image acquired;
generate point group data regarding the face of the occupant, the point group data indicating an outline of the face of the occupant and positions of facial features of the face of the occupant, in the segmented captured region of the face of the occupant;
generate patch data with use of the generated point group data as a reference of image separation, the patch data separating the segmented captured region of the face of the occupant; and
transmit, to the server apparatus, the generated point group data and the generated patch data instead of the captured image including the face of the occupant, together with classification data regarding the occupant or the vehicle with which the occupant is uniquely unidentifiable, the one or more server memories being configured to hold data regarding sample face images, as data regarding face images of random persons different from the occupant to be segmented from the captured image, the data regarding the sample face images including point group data and patch data regarding the sample face images, and being associated with classification data regarding the sample face images, the one or more server processors being configured to select, with use of the classification data regarding the occupant or the vehicle received from the one or more vehicle processors, one of the sample face images associated with data corresponding to the classification data regarding the occupant or the vehicle, from the sample face images held in the one or more server memories, carry out morphing with use of the point group data and the patch data regarding the selected one of the sample face images, and the point group data and the patch data generated regarding the occupant, to generate a morphed face image, and allow the output unit to output the morphed face image generated by the morphing, instead of a face image of the occupant of the vehicle.

2. The vehicle service providing system according to claim 1, wherein the one or more server memories are configured to hold the data regarding the sample face images in association with vehicle classification data, as the classification data regarding the sample face images, the vehicle classification data including one or both of data regarding regions to which the random persons in the respective sample face images belong, and vehicle specification data in the regions, the one or more vehicle processors are configured to transmit, to the server apparatus, one or both of positional data regarding the vehicle of the occupant, and specification data regarding the vehicle, as the classification data regarding the occupant or the vehicle with which the occupant is uniquely unidentifiable, and in the selecting one of the sample face images, the one or more server processors are configured to select, from the sample face images held in the one or more server memories, one of the sample face images associated with data corresponding to the positional data regarding the vehicle of the occupant or the specification data regarding the vehicle received from the one or more vehicle processors.

3. The vehicle service providing system according to claim 2, wherein the one or more server memories are configured to hold the data regarding the sample face images in further association with vehicle setting data corresponding to physical constitutions of the random persons in the respective sample face images, as the classification data regarding the sample face images, the one or more vehicle processors are configured to transmit, to the server apparatus, vehicle setting data corresponding to a physical constitution of the occupant, as the classification data regarding the occupant or the vehicle with which the occupant is uniquely unidentifiable, and in the selecting one of the sample face images, the one or more server processors are configured to select, from the sample face images held in the one or more server memories, one of the sample face images associated with data corresponding to the vehicle setting data corresponding to the physical constitution of the occupant received from the one or more vehicle processors.

4. The vehicle service providing system according to claim 3, wherein the one or more server memories are configured to classifiably hold the data regarding the sample face images in further association with classification data regarding the random persons in the respective sample face images, as the classification data regarding the sample face images, the classification data regarding the random persons in the respective sample face images being data with which the random persons in the respective sample face images are uniquely unidentifiable, the one or more vehicle processors are configured to transmit, to the server apparatus, classification data regarding the occupant, as the classification data regarding the occupant or the vehicle with which the occupant is uniquely unidentifiable, and in the selecting one of the sample face images, the one or more server processors are configured to select, from the sample face images held in the one or more server memories, one of the sample face images associated with data corresponding to the classification data regarding the occupant received from the one or more vehicle processors.

5. The vehicle service providing system according to claim 4, wherein in the selecting one of the sample face images, on a condition that two or more of the sample face images are selected with the use of the classification data regarding the occupant or the vehicle with which the occupant is uniquely unidentifiable, the one or more server processors are configured to select one of the sample face images to be used in the morphing, on an additional basis of a degree of similarity of the face images.

\* \* \* \* \*